(12) United States Patent
Xue et al.

(10) Patent No.: US 10,176,374 B2
(45) Date of Patent: Jan. 8, 2019

(54) IMAGE PROCESSING METHOD AND APPARATUS

(71) Applicant: Samsung Electronics Co., Ltd., Suwon-si (KR)

(72) Inventors: Kang Xue, Beijing (CN); Shuzheng Gao, Qingdao (CN); Xiying Wang, Beijing (CN); Haitao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/361,092

(22) Filed: Nov. 25, 2016

(65) Prior Publication Data
US 2017/0076136 A1 Mar. 16, 2017

Related U.S. Application Data

(63) Continuation of application No. PCT/KR2015/005288, filed on May 27, 2015.

(30) Foreign Application Priority Data

May 27, 2014 (CN) .......................... 2014 1 0228899

(51) Int. Cl.
*G06K 9/00* (2006.01)
*G06F 3/01* (2006.01)
(Continued)

(52) U.S. Cl.
CPC ............. *G06K 9/0061* (2013.01); *G06F 3/01* (2013.01); *G06F 3/013* (2013.01); *G06K 9/00288* (2013.01); *G06K 9/00335* (2013.01); *G06K 9/4604* (2013.01); *G06K 9/4647* (2013.01); *G06T 7/20* (2013.01); *G06T 2207/20068* (2013.01); *G06T 2207/30196* (2013.01)

(58) Field of Classification Search
CPC ............... G06K 9/0061; G06K 9/4604; G06K 9/00288; G06K 9/00335
See application file for complete search history.

(56) References Cited

U.S. PATENT DOCUMENTS 5,912,721 A * 6/1999 Yamaguchi .......... G06K 9/0061
351/209
8,594,374 B1* 11/2013 Bozarth .................. G06F 21/36
382/103
(Continued)

FOREIGN PATENT DOCUMENTS

EP 0990416 A1 4/2000
JP 8-322796 A 12/1996
(Continued)

OTHER PUBLICATIONS

Ito et al, An English machine translation of JP2010-51446, 2010.*
(Continued)

*Primary Examiner* — Ruiping Li
(74) *Attorney, Agent, or Firm* — NSIP Law

(57) ABSTRACT

An image processing method includes determining a vertical baseline and a horizontal baseline corresponding to a boundary of an eye of a user in an input image of the eye of the user, and aligning the input image based on the vertical baseline and the horizontal baseline.

22 Claims, 12 Drawing Sheets

(51) Int. Cl.
*G06K 9/46* (2006.01)
*G06T 7/20* (2017.01)

(56) References Cited

U.S. PATENT DOCUMENTS

| | | |
|---|---|---|
| 2007/0031041 A1 | 2/2007 | Ko et al. |
| 2012/0014610 A1 | 1/2012 | Nakashi et al. |

FOREIGN PATENT DOCUMENTS

| | | |
|---|---|---|
| JP | 2000-67261 A | 3/2000 |
| JP | 2001-22933 A | 1/2001 |
| JP | 2010-51446 A | 3/2010 |
| JP | 2010-134608 A | 6/2010 |
| KR | 10-0552709 B1 | 2/2006 |
| KR | 10-2012-0006819 A | 1/2012 |
| KR | 10-2012-0053389 A | 5/2012 |
| KR | 10-2013-0099521 A | 9/2013 |

OTHER PUBLICATIONS

K.-H. Tan et al., "Appearance-based Eye Gaze Estimation," *Proceedings of the Sixth IEEE Workshop on Applications of Computer Vision (WACV 2002)*, pp. 191-195, 2002, Conference held Dec. 3 and 4, 2002, Orlando.

International Search Report dated Jul. 9, 2015, in counterpart International Application No. PCT/KR2015/005288 (4 pages, including English translation).

Written Opinion of the International Searching Authority dated Jul. 9, 2015, in counterpart International Application No. PCT/KR2015/005288 (12 pages, including English translation).

\* cited by examiner

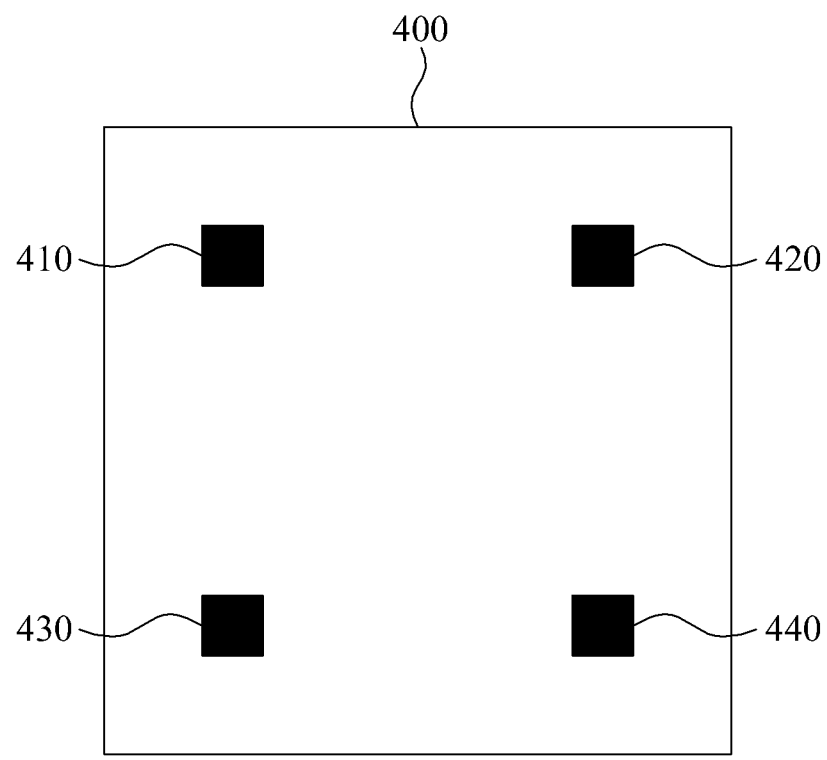

FIG. 5
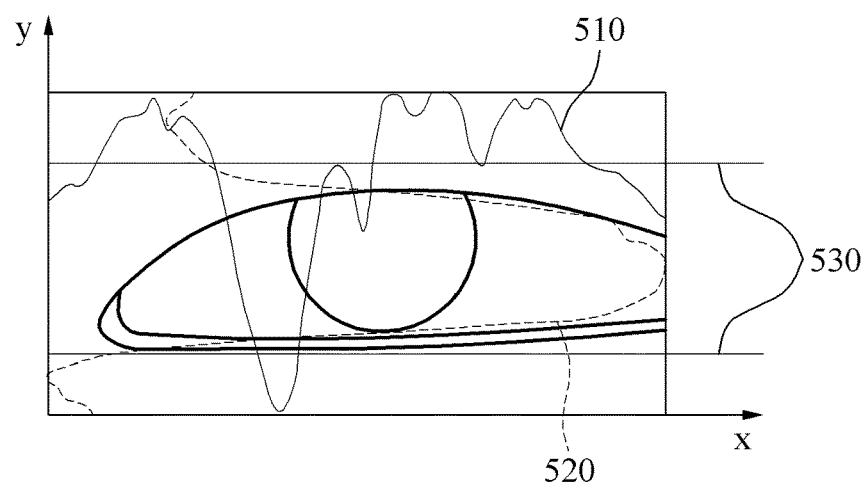
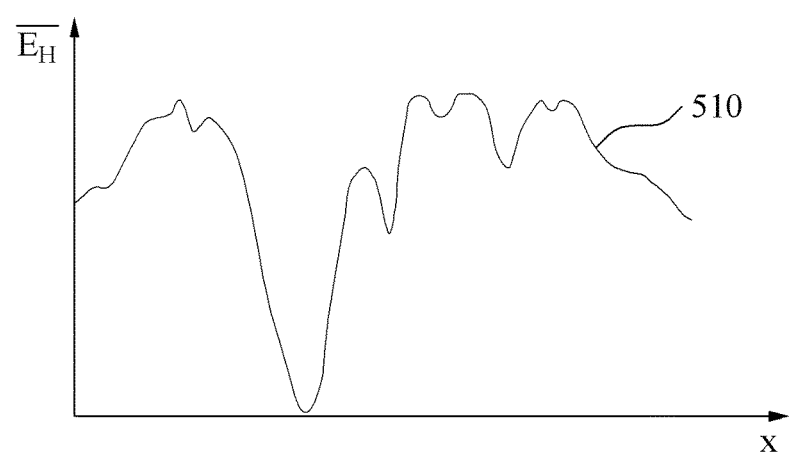
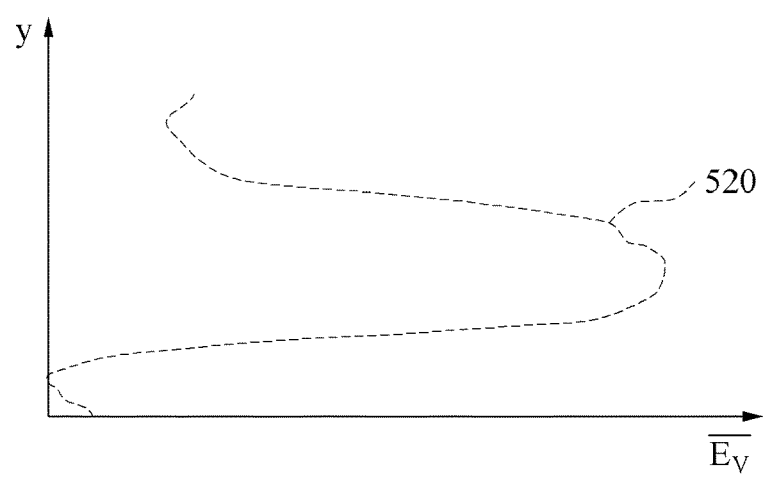

FIG. 6
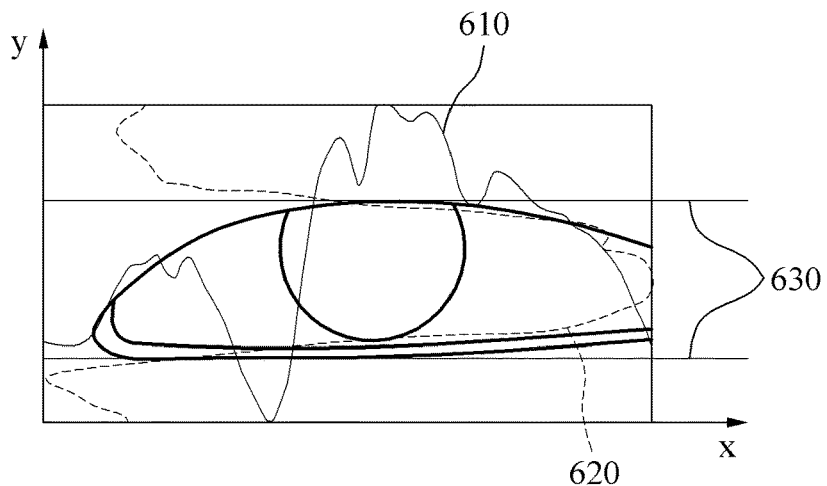
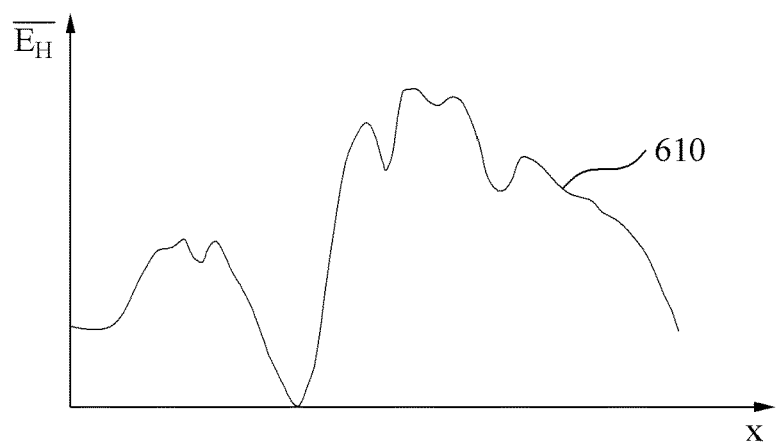
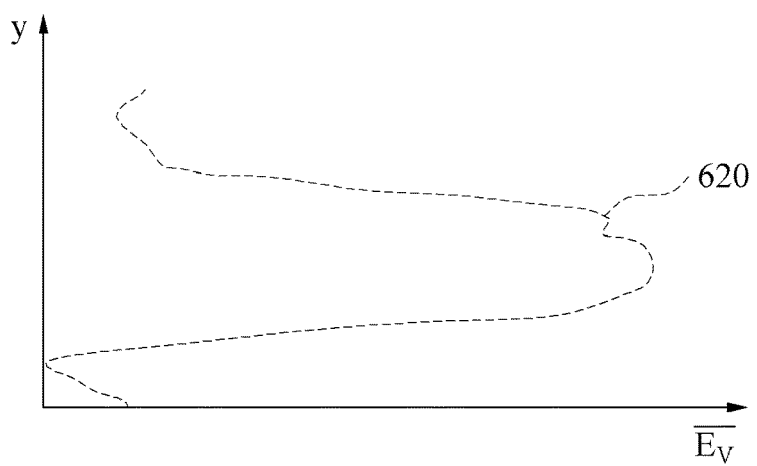

IMAGE PROCESSING METHOD AND APPARATUS

CROSS-REFERENCE TO RELATED APPLICATIONS

This application is a continuation of International Application No. PCT/KR2015/005288 filed on May 27, 2015, which claims the benefit of Chinese Patent Application No. 201410228899.2 filed on May 27, 2014, in the State Intellectual Property Office of China, the entire disclosures of which are incorporated herein by reference for all purposes.

BACKGROUND

1. Field

The following description relates to an image processing method and apparatus.

2. Description of Related Art

In a field of gaze estimation technology, analyzing eye movement information varying in response to a change in a gaze may be a significant issue. Typically, there may be at least two general gaze tracking approaches, a geometric-based approach where specific features, e.g., corneal/retinal glints, are used to extract a gaze direction, and an appearance-based approach that may exploit many eye features together, or an entirety of a captured eye, to learn a mapping between eye appearance and gaze direction. In addition, compared to the explicit geometric features determined in geometric-based approaches, appearance-based approaches may treat an image as points in a high-dimensional space, such as a 20 pixel by 40 pixel intensity image being considered an 800-component vector, or a point in an 800-dimensional space. In the appearance-based approach there may further be a desire to derive a way to compare eye mappings without too much information, e.g., without too great of a capturing pixel resolution.

Thus, when eye movement information is being analyzed based on the change in the gaze, unnecessary information may be removed from an eye image, which may result in greater efficiency and accuracy of gaze applications based on image information and enhanced image alignment. However, with the extent of information in different and varying eye details, such as eye lids and eye lashes, there may typically be a need for sufficiently high resolution to capture such information, the analysis of which reduces efficiency of gaze applications.

In addition, in the example appearance-based approach, to accurately analyze the eye movement information, alignment of the eye image may be desirable. By detecting an eye of a user in the eye image at a high accuracy, a plurality of eye images may be aligned based on a predetermined reference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes determining a vertical baseline and a horizontal baseline corresponding to a boundary of an eye of a user in an input image of the eye of the user, and aligning the input image based on the vertical baseline and the horizontal baseline.

The determining may include determining the vertical baseline based on a first projection result obtained by projecting the input image to a first axis and a second projection result obtained by projecting the input image to a second axis.

The determining may include normalizing the second projection result based on the first projection result, and determining the vertical baseline based on a normalization value of the second projection result.

The first axis may correspond to an x axis of the input image and the second axis may correspond to a y axis of the input image.

The determining may include determining first straight lines corresponding to an upper boundary and a lower boundary of the eye of the user based on a first projection result obtained by projecting the input image to a first axis and a second projection result obtained by projecting the input image to a second axis, determining a second straight line corresponding to the lower boundary of the eye of the user based on a third projection result obtained by projecting a partial image located between the first straight lines to the first axis and a fourth projection result obtained by projecting the partial image to the second axis, and determining the second straight line to be the vertical baseline.

The vertical baseline may be a straight line in contact with a lower eyelid of the eye of the user and disposed parallel with an x axis.

The determining may include determining a skin model using an inner canthus area included in the input image, classifying the inner canthus area into a skin area and an eye area based on the skin model, and determining the horizontal baseline based on the eye area, and the inner canthus area may include an inner canthus point of the eye of the user.

The determining of the skin model may include determining the skin model based on a determined skin pixel of the inner canthus area.

The skin model may be updated using a determined inner canthus area resetting the inner canthus area based on the classified skin area and the classified eye area.

The determining of the horizontal baseline may include determining an innermost pixel, relative to a centerline of the user, of the eye area to be the inner canthus point, and determining a straight line passing through the inner canthus point and disposed parallel with a y axis to be the horizontal baseline.

The method may further include determining a movement responsivity based on the input image aligned relative to the vertical baseline and the horizontal baseline.

The aligning of the input image may include aligning plural input eye images, and a horizontal component of the movement responsivity may be determined based on a difference between the aligned input eye images having a gaze direction vertically substantially identical and horizontally different.

The aligning of the input image may include aligning plural input eye images, and a vertical component of the movement responsivity may be determined based on a difference in pixel values of the aligned input eye images having a gaze direction horizontally substantially identical and vertically different.

The aligning of the input image may include aligning plural input eye images, and a horizontal component may be determined by applying a principal component analysis to the aligned input eye images, each having a gaze direction vertically substantially identical and horizontally different.

The aligning of the input image may include aligning plural input eye images, and a vertical component of the movement responsivity may be determined by applying a principal component analysis to the aligned input eye images, each having a gaze direction horizontally substantially identical and vertically different.

The method may further include determining movement information of the eye of the user based on the movement responsivity, and predicting a gaze of the user based on the movement information of the eye of the user.

In another general aspect, a non-transitory computer-readable storage medium stores instructions that, when executed by a processor, cause the processor to perform the method described above.

In another general aspect, an image processing apparatus includes a receiver configured to receive an input image of an eye of a user, and a processor configured to determine a vertical baseline and a horizontal baseline corresponding to a boundary of the eye of the user in the input image, and align the input image based on the vertical baseline and the horizontal baseline.

The processor may be configured to determine the vertical baseline based on a first projection result obtained by projecting the input image to a first axis and a second projection result obtained by projecting the input image to a second axis.

The processor may be configured to determine a skin model using an inner canthus area included in the input image, classify the inner canthus area into a skin area and an eye area based on the skin model, and determine the horizontal baseline, and the inner canthus area may include an inner canthus point of the eye of the user.

Other features and aspects will be apparent from the following detailed description, the drawings, and the claims.

BRIEF DESCRIPTION OF THE DRAWINGS

FIG. 4 illustrates an example of aiming points according to an embodiment.

FIGS. 5 and 6 illustrate examples of determining a vertical baseline according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

One or more embodiments may provide a method of accurately extracting a vertical baseline and a horizontal baseline corresponding to a boundary of an eye of a user in an input image, thereby effectively enhancing accuracy in an alignment of the input image.

Figure 1:
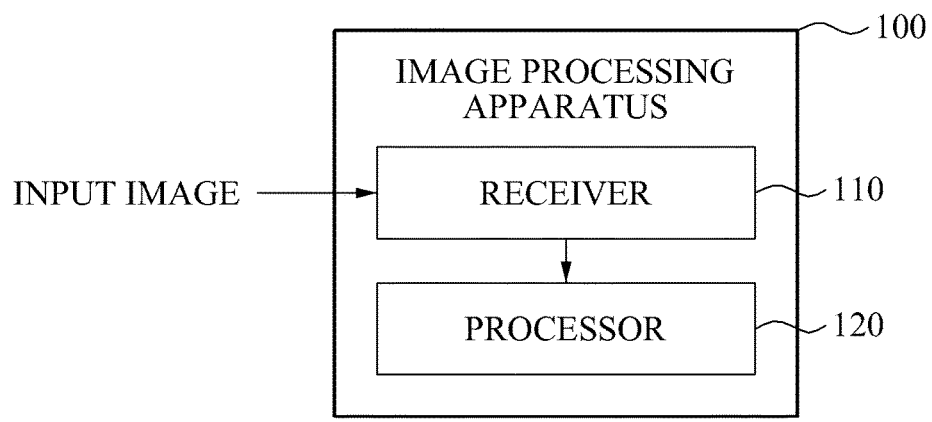
FIG. 1 illustrates an example of an image processing apparatus according to an embodiment.

FIG. 1 illustrates an example of an image processing apparatus according to an embodiment.

Referring to FIG. 1, an image processing apparatus 100 may include a receiver 110 and a processor 120. The image processing apparatus 100 may be implemented by hardware components configured to perform operations described in this application. The image processing apparatus 100 may be included in or may be various computing devices and/or systems, for example, a smartphone, a tablet computer, a laptop computer, a desktop computer, a wearable device, a security system, and a smart home system.

The receiver 110 may receive an input image including an eye of a user. As an example, the receiver 110 may receive an input image obtained by capturing an image of the eye of the user from a vision sensor, e.g., a camera, or may receive an input image stored in a storage, e.g., memory. The vision sensor and the storage may be included in the image processing apparatus 100 or disposed externally to the image processing apparatus 100.

An input image may be, for example though not necessary, an image in which both corners of the eye of the user are or have been initially horizontally aligned. For example, the input image may be an image in which a line connecting an inner canthus point to an outer canthus point is horizontally aligned, e.g., to be parallel to an x axis, such as an x axis that is a same reference axis for multiple eye images.

In one or more embodiments, the processor 120 may determine a vertical baseline and a horizontal baseline corresponding to a boundary of the eye of the user in the input image of the eye of the user. The boundary of the eye of the user corresponds to a perimeter of the eye bounded by the user's upper and lower eyelids, for example. Additionally, the processor 120 may align the input image based on the vertical baseline and the horizontal baseline. The vertical baseline and the horizontal baseline may be determined by detecting the eye of the user from the input image. Also, the processor 120 may determine a movement responsivity of the eye of the user based on the aligned input image. The processor 120 may determine movement information of the eye of the user based on the movement responsivity, and predict a gaze of the user based on the movement information. For example, in an embodiment, the eye of the user may be compared in the aligned eye images, thereby effectively analyzing the eye movement information.

Figure 2:
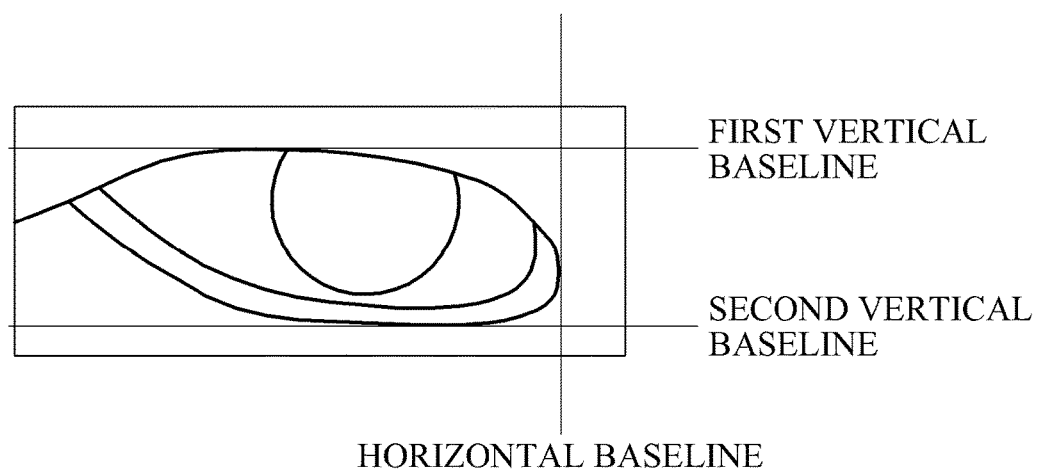
FIG. 2 illustrates an example of baselines for aligning an input image according to an embodiment.

FIG. 2 illustrates an example of baselines for aligning an input image according to an embodiment.

Two vertical baselines, for example, a first vertical baseline and a second vertical baseline, and one horizontal baseline may be illustrated in FIG. 2. The vertical baselines and the horizontal baseline may be set based on a boundary of an eye of a user included in an input image so as to be used to detect the eye of the user from the input image.

The vertical baselines may be set based on an upper boundary and a lower boundary of the eye of the user. The vertical baselines may be, for example, straight, parallel lines in contact with eyelids of the user. When both corners of the eye of the user included in the input image are horizontally aligned, the vertical baselines may be set to be parallel with an x axis of the input image. The vertical baselines may be used to detect a vertical position of the eye of the user. According to the example in FIG. 2, the first vertical baseline may be a straight line in contact with an upper eyelid of the user and disposed parallel with the x axis of the input image. The second vertical baseline may be, for example, a straight line in contact with a lower eyelid of the user and disposed parallel with the x axis.

The horizontal baseline may be, for example, a straight line vertically passing through an inner canthus point of the eye of the user, e.g., compared to an outer canthus point of the eye furthest from a centerline of the user. When both corners of the eye of the user included in the input image are horizontally aligned, the horizontal baseline may be set to be parallel with a y axis of the input image. The horizontal baseline may be used to detect a horizontal position of the eye of the user. The horizontal baseline may be, for example, a straight line passing through the inner canthus point of the user and disposed parallel with the y axis of the input image.

The inner canthus point may be, for example, a point indicating an inner canthus corresponding to an inward corner of an eye of the user. The inward corner may indicate a corner positioned closer to a facial centerline or nose of the user than another corner, e.g., the outer cantus point, of the eye of the user, e.g., compared to an outer canthus point of the eye furthest from a centerline of the user.

In an embodiment, the y-axis may act as another horizontal baseline or another horizontal baseline may be determined as a straight line vertically passing through the outer cantus point or area of the eye of the user, for example. In an embodiment, and only as an example, the vertical baseline(s) and horizontal baseline(s) may be used to both align and limit an area of a whole image of the user that is considered for gaze detection or of a patch of the whole image that includes the eye. In one or more embodiments, and only as examples, the vertical baseline(s) and horizontal baseline(s) may be used to align and crop and/or define extents of each of multiple eye images, e.g., with respect to same x and/or y axes, used in a calibration of a system for gaze detection, or may be used to align and crop and/or define the extents of a currently input eye image for gaze detection based on such calibration, where information of such an aligned and cropped and/or extent defined eye image is converted into a mathematical dimensional space that considers multiple aspects of the eye image for incorporation into, or comparison with, other mathematical dimensional space representations of eye images for different gaze directions, such as in an appearance-based gaze tracking embodiment. The mathematical dimensional space may be a one or more dimensional space and/or there may be multiple one or more dimensional spaces derived to represent respective information of the eye image. In addition, through the example alignment in FIG. 2, an input image is illustrated with the horizontal or vertical baselines being positively distanced from the respective x or y axes, for example, this representation is only for demonstrative purposes and embodiments are not limited thereto.

Figure 3A:
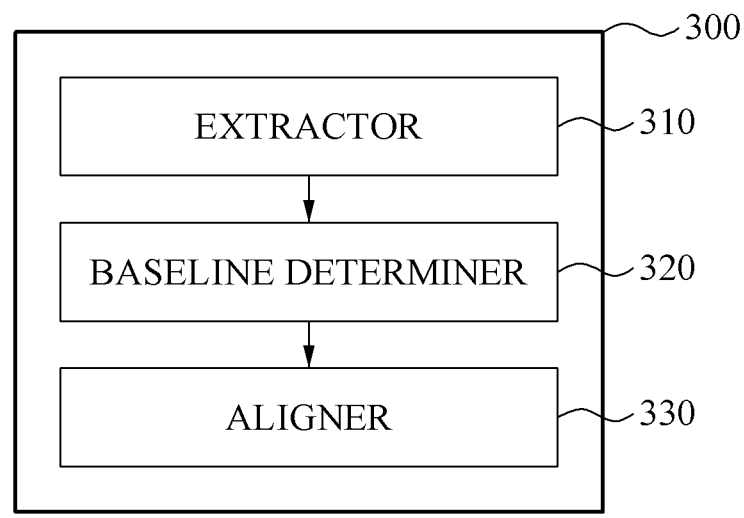
FIG. 3A illustrates an example of an image processor aligning an input image based on a vertical baseline and a horizontal baseline determined according to an embodiment.
Figure 3B:
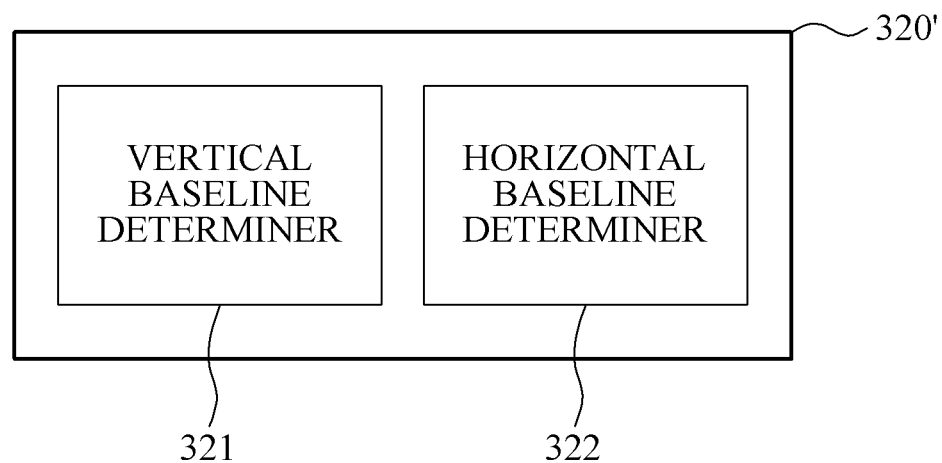
FIG. 3B illustrates an example of a baseline determiner according to an embodiment.

FIG. 3A illustrates an example of aligning an input image based on a vertical baseline and a horizontal baseline determined according to an embodiment. FIG. 3B illustrates an example of a baseline determiner according to an embodiment.

Referring to FIGS. 3A and 3B, a processor 300 may include an extractor 310, a baseline determiner 320, and an aligner 330. The processor 300 may be, for example, representative of the processor 120 included in the image processing apparatus 100 of FIG. 1, however, embodiments are not limited thereto. The processor 300 may process an input image.

The extractor 310 may extract eye images of different gaze states from the input image. A different gaze state may indicate a state in which the eye of the user gazes at an object at a different position. The eye images of the different gaze states may indicate images, each including the eye of the user in the different gaze state. For example, the extractor 310 may extract eye images during a calibration phase and/or extract eye images during an eye tracking phase. In an embodiment, such an eye tracking phase may be based on the extractor 310, or another extractor 310 or extractor 310 of another processor 300, having previously extracted eye images during such a calibration phase for use in the example eye tracking phase.

As an example, descriptions related to the eye images of the different gaze states will be provided under an assumption that the user gazes at different aiming or calibration points, for example, a first aiming point 410, a second aiming point 420, a third aiming point 430, and a fourth aiming point 440 in a display or user interface 400 with reference to FIG. 4. Since the different aiming points are located at different positions, the eye images of the different gaze states may be generated by capturing the user gazing at the different aiming points. The user interface may be incorporated in a smartphone, vehicle, tablet, or laptop, or may be projected points in space such as in a virtual reality environment.

When the user sequentially gazes at the first aiming point 410 and then gazes at the second aiming point 420, or the user sequentially gazes at the second aiming point 420 and then gazes at the first aiming point 410, the extractor 310 may extract eye images of horizontally different gaze states. Similarly, when the user gazes at the third aiming point 430 and then gazes at the fourth aiming point 440, or the user sequentially gazes at the fourth aiming point 440 and then gazes at the third aiming point 430, the extractor 310 may extract eye images of horizontally different gaze states. When the user sequentially gazes at the first aiming point 410 and then gazes at the third aiming point 430, or the user sequentially gazes at the third aiming point 430 and then gazes at the first aiming point 410, the extractor 310 may extract eye images of vertically different gaze states. Similarly, when the user sequentially gazes at the second aiming point 420 and then gazes at the fourth aiming point 440, or the user sequentially gazes at the fourth aiming point 440 and then gazes at the second aiming point 420, the extractor 310 may extract eye images of vertically different gaze states.

The eye images of the different gaze states may be extracted when a vision sensor included in the display 400 captures the user gazing at each of the different aiming points. The vision sensor may be implemented as a camera. Although FIG. 4 illustrates that the display 400 includes four aiming points including the first aiming point 410 through the fourth aiming point 440 as an example, the number of aiming points is not limited thereto and thus, the display 400 may include variable numbers of aiming points.

The baseline determiner 320 may determine a vertical baseline and a horizontal baseline corresponding to a boundary of the eye of the user in the input image. Referring back to FIG. 3B, the baseline determiner 320 may include, for example, a vertical baseline determiner 321 and a horizontal baseline determiner 322, separately. Hereinafter, for increased clarity and conciseness, the input image including the eye of the user may indicate an eye image extracted by the extractor 310.

The baseline determiner 320 may determine the vertical baseline through a projection of the input image. In this example, the input image used in the projection may be, for example, a grayscale image. Also, the input image may be, for example, an image resulting from a color inversion processing performed on the grayscale image. The color inversion processing may be conducted by, for example, performing an operation of 255-I, e.g., with I denoting an intensity or gray scale value of a pixel in the input image between 0 and 255.

The baseline determiner 320 may determine the vertical baseline based on a first projection result obtained by projecting the input image onto a first axis and a second projection result obtained by projecting the input image onto a second axis. Here, the first axis may correspond to an x axis of the input image, and the second axis may correspond to a y axis of the input image.

The baseline determiner 320 may project the input image onto the first axis by accumulating values of pixels included in the same column of the input image based on a direction of the column. The baseline determiner 320 may normalize the first projection result of a horizontal direction as in the below Equation 1, for example.

$$\overline{E}_H = \frac{E_H - \min(E_H)}{\max(E_H) - \min(E_H)} \quad (1)$$

$$E_H = [E_{H1}, E_{H2}, E_{H3}, \ldots, E_{Hi}]$$

$$\overline{E}_H = [\overline{E}_{H1}, \overline{E}_{H2}, \overline{E}_{H3}, \ldots, \overline{E}_{Hi}]$$

In Equation 1, $E_H$ denotes the first projection result. The first projection result may indicate, for example, a set of column-directional cumulative pixel values obtained by accumulating values of pixels included in the same column of the input image based on a direction of the column. For example, $E_{Hi}$ denotes an i-th column-directional cumulative pixel value obtained by accumulating values of pixels corresponding to an i-th column in the input image. Max($E_H$) denotes a column-directional cumulative pixel value having a greatest value in the set of the column-directional cumulative pixel values. Min($E_H$) denotes a column-directional cumulative pixel value having a smallest value in the set of the column-directional cumulative pixel values.

$\overline{E}_H$ denotes a value obtained by normalizing the first projection result. $\overline{E}_{Hi}$ denotes a value obtained by normalizing the i-th column-directional cumulative pixel value. For example, $\overline{E}_{Hi}$ indicates a normalized cumulative value corresponding to the i-th column of the input image, and may have a value between 0 and 1.

The baseline determiner 320 may project the input image onto the second axis by accumulating values of pixels included in the same row of the input image based on a direction of the row. Also, the baseline determiner 320 may normalize the second projection result of a vertical direction based on the first projection result of the horizontal direction according to the below Equation 2, for example.

$$\overline{E}_V = \frac{E_V \times \overline{E}_H - \min(E_V \times \overline{E}_H)}{\max(E_V \times \overline{E}_H) - \min(E_V \times \overline{E}_H)} \quad (2)$$

$$E_V = [E_{V1}, E_{V2}, E_{V3}, \ldots, E_{Vi}]$$

$$\overline{E}_H = [\overline{E}_{V1}, \overline{E}_{V2}, \overline{E}_{V3}, \ldots, \overline{E}_{Vi}]$$

In Equation 2, $E_V$ denotes the second projection result. The second projection result may indicate, for example, a set of row-directional cumulative pixel values obtained by accumulating values of pixels included in the same row of the input image based on a direction of the row. $E_{Vi}$ denotes an i-th row-directional cumulative pixel value obtained by accumulating values of pixels corresponding to an i-th row of the input image. Max($E_V$) denotes a row-directional cumulative pixel value having the greatest value in the set of the row-directional cumulative pixel values. Min($E_V$) denotes a row-directional cumulative pixel value having the smallest value in the set of the row-directional cumulative pixel values.

$\overline{E}_V$ denotes a value obtained by normalizing the second projection result. $\overline{E}_{Vi}$ denotes a value obtained by normalizing the i-th row-directional cumulative pixel value. For example, $\overline{E}_{Vi}$ indicates a normalized cumulative pixel value corresponding to the i-th row of the input image, and may have a value between 0 and 1. In contrast to the normalizing of the first projection result of the horizontal direction described with reference to Equation 1, the normalizing of the second projection result of the vertical direction may be performed in consideration of the first projection result according to the below Equation 3, for example.

$$E_V \times \overline{E}_H = [E_{V1} \times \overline{E}_{H1}, E_{V2} \times \overline{E}_{H2}, E_{V3} \times \overline{E}_{H3}, \ldots, E_{Vi} \times \overline{E}_{Hi}] \quad (3)$$

The baseline determiner 320 may normalize the second projection result of the vertical direction using a normalization value of the first projection result of the horizontal direction as a prior probability. The prior probability may indicate a probability distribution obtained by an observer in advance of observation in a Bayesian inference, and may also be referred to as a boundary probability or a priori probability.

The baseline determiner 320 may determine the vertical baseline based on a normalization value of the second projection result and a predetermined threshold. As an example, the baseline determiner 320 may determine the vertical baseline to be a row having a normalization value of the second projection result meeting the predetermined threshold. As another example, the baseline determiner 320 may determine the vertical baseline to be a row having a normalization value within a range determined to be between two predetermined thresholds.

The baseline determiner 320 may determine a position of an inner canthus point in the input image, and determine a straight line passing through the inner canthus point and disposed parallel with the y axis of the input image as the horizontal baseline.

The baseline determiner 320 may determine the position of the inner canthus point in the input image based on a skin model. For example, the baseline determiner 320 may determine an inner canthus area in the input image based on an inner canthus point extraction algorithm. The inner canthus area may be classified into a skin area and an eye area, for example, a non-skin area, and may include the inner canthus point.

The baseline determiner 320 may determine the skin model based on an adjacent skin pixel of the inner canthus area. As an example, the baseline determiner 320 may determine the skin model based on a skin pixel corresponding to a pixel within a skin area among pixels surrounding the inner canthus area. Alternatively, the baseline determiner 320 may arbitrarily select a skin pixel included in the skin area of the inner canthus area, and generate the skin model based on the selected skin pixel. The baseline determiner 320 may determine the skin model according to the below Equation 4, for example.

$$\text{Model}_{skin}^1 \approx N(\mu_1, \sigma_1^2) = \frac{1}{\sqrt{2\pi\sigma_1^2}} \exp\left\{-\frac{(x-\mu_1)^2}{2\sigma_1^2}\right\} \quad (4)$$

In Equation 4, $\mu_1$ denotes an average grayscale value of an initial skin pixel, for example, a selected adjacent skin pixel of the inner canthus area. $\sigma_1^2$ denotes a grayscale value distribution of the initial skin pixel.

The baseline determiner 320 may classify the inner canthus area into the skin area and the eye area based on the skin model. For example, the baseline determiner 320 may classify a pixel included in the inner canthus area according to the below Equation 5, for example.

$$P_1(x) \approx N(x|\mu_1, \sigma_1^2) \quad (5)$$

In Equation 5, $P_1(x)$ denotes a probability that a pixel x included in the inner canthus area is the skin pixel. Thus, the baseline determiner 320 may determine whether the pixel x is included in the skin area based on whether $P_1(x)$ is greater than a predetermined threshold. For example, when $P_1(x)$ is greater than the predetermined threshold, the baseline determiner 320 may classify the pixel x as belonging to the skin area. Conversely, when $P_1(x)$ is less than or equal to the predetermined threshold, the baseline determiner 320 may classify the pixel x as belonging to the eye area.

The baseline determiner 320 may determine the position of the inner canthus area based on the classified eye area. As an example, the baseline determiner 320 may determine an innermost pixel of the eye area as the inner canthus point. The innermost pixel of the eye area may indicate a closest position to a nose of the user. As another example, the baseline determiner 320 may determine the closest pixel to an eyebrow in the eye area as the position of the inner canthus point.

The baseline determiner 320 may determine a straight line passing through the inner canthus point and disposed parallel with the y axis, as the horizontal baseline.

The aligner 330 may align the input image based on the vertical baseline and the horizontal baseline. The aligner 330 may align the input images of the different gaze states based on the vertical baseline and the horizontal baseline, thereby efficiently analyzing the eye of the user included in the input images of the different gaze states.

For example, the aligner 330 may align the input image based on a vertical baseline in contact with a lower eyelid of the user between two vertical baselines determined by the baseline determiner 320. In general, a movement of an upper eyelid may be more active than a movement of the lower eyelid. Thus, a threshold for detecting the vertical baseline corresponding to the lower eyelid may be more easily set than a threshold for detecting the vertical baseline corresponding to the upper eyelid. By aligning the input image based on the vertical baseline corresponding to the lower eyelid, accuracy of an eye alignment may increase as compared to aligning the input image based on the vertical baseline corresponding to the upper eyelid. Though the description notes aligning the vertical baseline in contact with the lower eyelid, embodiments are not limited to the same and may include aligning the vertical baseline in contact with the upper eyelid.

FIGS. 5 and 6 illustrate examples of determining a vertical baseline according to an embodiment.

Referring to FIG. 5, graph 510 represents respective normalized values of a first axis projection result that may be obtained by projecting an input image to a first axis, e.g., with each of the normalized values of the graph 510, progressing in the x axis direction, corresponding to a normalized example summed column pixel values respectively across the x axis, such as the normalized $E_H$ values of Equation 1 above, e.g., $\overline{E}_H$. The graph 520 represents respective normalized values of a second axis projection result that may be obtained by projecting the input image to a second axis, e.g., with each of the normalized values of the graph 520, progressing in the y axis direction, corresponding to a normalized example summed row pixel values respectively across the y axis, such as the normalized $E_V$ values of Equation 2 above, e.g., $\overline{E}_V$. Such as discussed above, the normalization values of graph 520 representing a normalized result of the second axis projection may be obtained by normalizing the results of the second axis projection using the normalization values of graph 510 for the first axis projection, i.e., as a prior probability. As only an example, the above Equation 3 demonstrates one example of using results of such a first axis projection as probability information in normalizing results of a second axis projection. Thus, vertical baselines 530 may be respectively determined based on comparisons of normalization values of the graph 520 for the second axis projection and one or more respective predetermined thresholds.

As illustrated in FIG. 5, the vertical baselines 530 are determined through a projection toward the first axis and a projection toward the second axis, the projections which are performed once, may be located on a skin close to an eyelid of a user. Hereinafter, these projections may also be collectively referred to as a first projection procedure. In an example, vertical baselines may also be more accurately determined by additionally performing one or more further projection procedures of projection toward the first axis and projection toward the second axis.

For example, based on the first axis projection and the second axis projection of FIG. 5, FIG. 6 illustrates a graph 610 representing respective normalized values of a third axis projection obtained by projecting a partial image, e.g., a cropped version of the original eye image now between the vertical baselines 530 that were determined through the first projection procedure of FIG. 5, such as with each of the normalized values of the graph 610, progressing in the x axis direction, corresponding to a normalized example summed column pixel values respectively across the x axis, such as the normalized $E_H$ values of Equation 1 above. The graph 620 represents respective normalized values of a fourth axis projection that may be obtained by projecting the partial image based on the vertical baselines 530 to the second axis, e.g., with each of the normalized values of the graph 620, progressing in the y axis direction, corresponding to a normalized example summed row pixel values respectively across the y axis, such as the normalized $E_V$ values of Equation 2 above. The third axis projection and the fourth axis projection, to determine refined vertical baselines 630, may be considered a second projection procedure.

For example, the third axis projection result may be generated and normalized by respectively accumulating values of pixels included in the same columns, e.g., along the x axis, of the partial image between the vertical baselines 530 determined through the first projection procedure. The fourth axis projection result may be generated by respectively accumulating values of pixels included in the same rows, e.g., along the y axis, of the partial image, which may also be based on a determined horizontal baseline in the first projection procedure, for example. The fourth axis projection result may be normalized using the normalization values of the graph 610 of the third axis projection as a prior probability, such as described above with regard to Equation 3, as only an example. Vertical baselines 630 may thus be determined based on the normalization values of the graph 620 of the fourth axis projection and one or more respective predetermined thresholds.

In an example, the vertical baselines 630 determined through the first projection procedure and the subsequent second projection procedure may represent a refinement of the vertical baselines 530, and, thus, the vertical baselines 630 may ultimately be located closer to an eyelid of the user when compared to the vertical baselines 530 determined through only the first projection procedure.

Although the aforementioned descriptions are provided based on an example in which the vertical baselines are determined through the first projection procedure and the second projection procedure, the number of times that such projection procedures are applied to determine the vertical baselines is not be limited thereto. When accuracy of the vertical baselines determined by performing the projection procedure twice is determined to be not sufficiently high, an additional projection procedure may be performed. When accuracy of the vertical baselines determined by performing the projection procedure once is determined sufficiently high, the additional projection procedure may be omitted. As only an example, such a sufficiency determination may be based on how close the eventually relied upon normalization values are to the correspondingly applied predetermined thresholds, for example.

Also, although the aforementioned descriptions are provided based on an example in which the second axis projection result is normalized using normalization values of the first axis projection result as the prior probability, a method of normalizing the second axis projection result is not limited thereto. For example, the second axis projection result may be normalized without application of the normalization values of the first axis projection result as the prior probability. Similarly or alternatively, the fourth axis projection result may be normalized without application of the normalization values of the third axis projection result as the prior probability.

Figure 7:
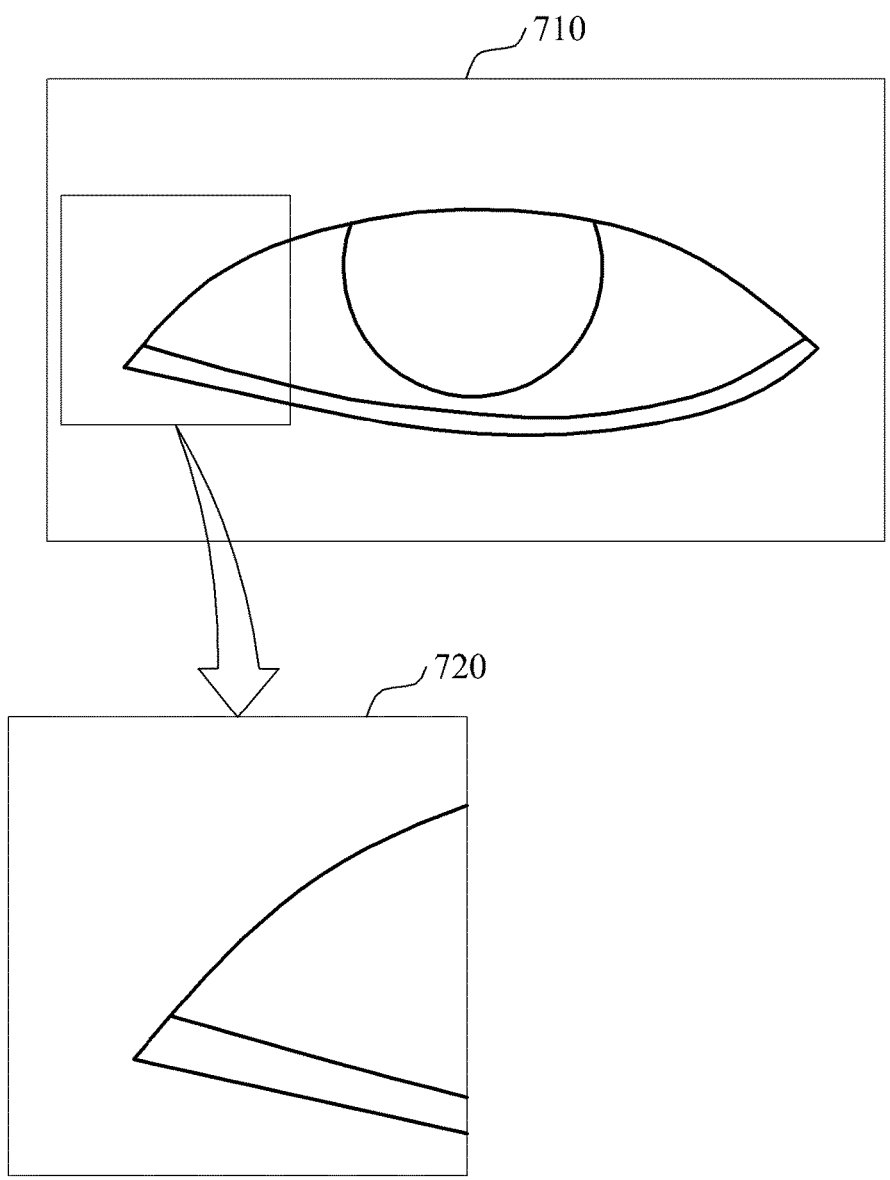
FIGS. 7 through 9 illustrate determining a horizontal baseline according to one or more embodiments.
Figure 8:
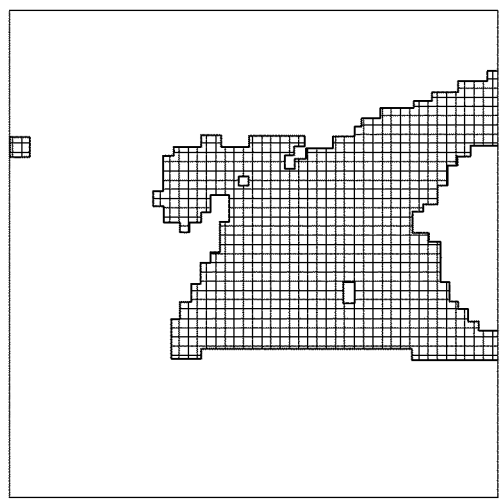
Figure 9:
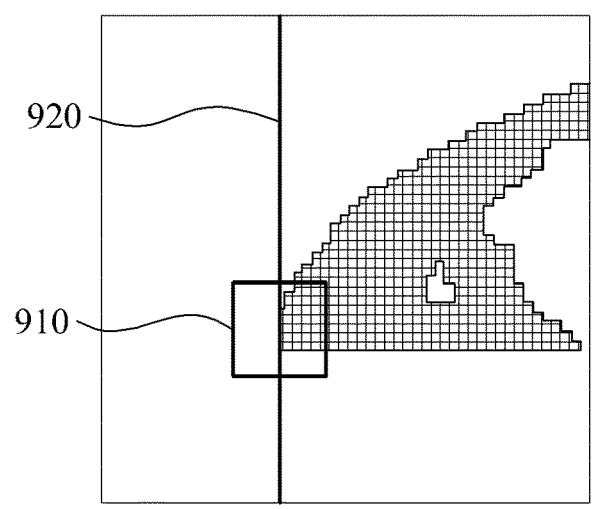

FIGS. 7 through 9 illustrate examples of determining a horizontal baseline according to an embodiment.

FIG. 7 illustrates an input image 710 and an inner canthus area 720. The inner canthus area 720 may be determined from the input image 710 based on an inner canthus point extraction algorithm. Various algorithms used in the related technology field are applicable to be the inner canthus point extraction algorithm for determining the inner canthus area 720.

A skin model may be determined based on an adjacent skin pixel of the inner canthus area 720. For example, the skin model may be determined based on a skin pixel corresponding to a skin among pixels surrounding the inner canthus area 720. Since a pixel surrounding a left portion of the inner canthus area 720 corresponds to skin, the skin model may be determined based on the skin pixel surrounding the left portion of the inner canthus area 720.

Alternatively, the skin model may be generated based on a skin pixel arbitrarily selected from a skin area in the inner canthus area 720. For example, a left edge portion of the inner canthus area 720 corresponds to the skin, the skin model may be determined based on a select skin pixel in the left edge portion of the inner canthus area 720.

An inner canthus area may be classified into a skin area and an eye area based on the skin model. In FIG. 8, a portion into which the inner canthus area is classified based on the skin model may be indicated by a grid pattern. Also, an innermost pixel of the eye area may be determined to be an inner canthus point, and a straight line passing through the inner canthus point and disposed parallel with a y axis may be determined to be a horizontal baseline. It is noted that, in one or more embodiments, the horizontal baseline determination may be performed before or after any of the aforementioned first, second, or further projection procedures.

Due to the skin model determined using a predetermined skin pixel, noise may occur in the skin model and thus, a result of the classifying of the eye area may be inaccurately obtained. As illustrated in FIG. 8, by classifying a portion of the skin area as the eye area, the eye area classified by the skin model may not appear as a form of the eye of the user. In this example, the inner canthus area may be reset based on the skin area and the eye area, and the skin model may be updated based on the reset inner canthus area. That is, the processor may recognize a shape of an eye area does not meet a predetermined shape and resets and recalculates the skin model and inner canthus area.

The baseline determiner 320 of FIG. 3 may reselect an adjacent skin pixel of the inner canthus area based on the skin area and the eye area into which the inner canthus area is classified at a first time, thereby increasing accuracy. The baseline determiner 320 may update the skin model based on the reselected skin pixel according to the below Equation 6, for example.

$$\text{Model}_{skin}^2 \approx N(\mu_2, \sigma_2^2) = \frac{1}{\sqrt{2\pi\sigma_2^2}} \exp\left\{-\frac{(x-\mu_2)^2}{2\sigma_2^2}\right\} \quad (6)$$

In Equation 6, $\mu_2$ denotes an average grayscale value of the reselected skin pixel, for example, the adjacent skin pixel reset based on the skin area and eye area into which the inner canthus area is classified at a first time, and $\sigma_2^2$ denotes a gray scale value distribution of the reselected skin pixel.

The baseline determiner 320 may classify the inner canthus area into the skin area and the eye area based on the updated skin model. For example, the baseline determiner 320 may classify pixels of the inner canthus area according to the below Equation 7, for example.

$$P_2(x) \approx N(x|\mu_2, \sigma_2^2) \quad (7)$$

In Equation 7, $P_2(x)$ denotes a probability that a pixel x of the inner canthus area is the skin pixel. Thus, the baseline determiner 320 may determine whether the pixel x is included in the skin area based on whether $P_2(x)$ is greater than a predetermined threshold. As an example, when $P_2(x)$ is greater than the predetermined threshold, the baseline determiner 320 may classify the pixel x as belonging to the skin area. Conversely, when $P_2(x)$ is less than or equal to the predetermined threshold, the baseline determiner 320 may classify the pixel x as belonging to the eye area.

FIG. 9 illustrates a skin area and an eye area obtained through a classification performed based on an updated skin model. In FIG. 9, the eye area in an inner canthus area may be indicated by a grid pattern. An innermost pixel of the eye area may be determined to be an inner canthus point 910, and a straight line passing through the inner canthus point 910 and disposed parallel with a y axis may be determined to be a horizontal baseline 920.

Although the aforementioned descriptions are provided based on an example in which the inner canthus area is classified into the skin area and the eye area through a classification procedure performed twice, the number of times that the classification procedure is applied to determine the horizontal baselines is not be limited thereto. When accuracy of the vertical baselines determined by performing the classification procedure twice is not sufficiently high, an additional classification procedure may be performed. When accuracy of the vertical baselines, determined by performing the classification procedure once, is sufficiently high, the additional classification procedure may be omitted.

Figure 10:
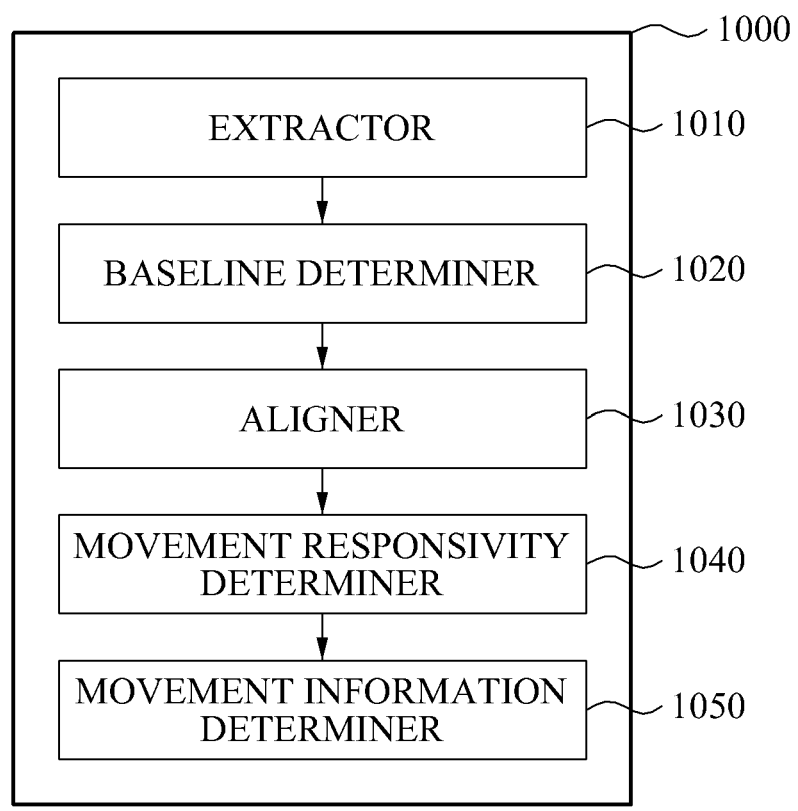
FIG. 10 illustrates an example of an image processor determining movement information of an eye of a user included in an input image according to an embodiment.

FIG. 10 illustrates an example of determining movement information of an eye of a user included in an input image according to an embodiment.

Referring to FIG. 10, a processor 1000 may include an extractor 1010, a baseline determiner 1020, an aligner 1030, a movement responsivity determiner 1040, and a movement information determiner 1050. The processor 1000 may be, for example, representative of the processor 120 included in the image processing apparatus 100 of FIG. 1, however, embodiments are not limited thereto. The processor 1000 may process an input image.

The extractor 1010 may extract eye images, each having a different gaze position, such as discussed above with regard to FIG. 4. The baseline determiner 1020 may determine one or more vertical baselines and horizontal baselines corresponding to a boundary of an eye of a user in an input image, such as discussed above with regard to FIGS. 5-9. The aligner 1030 may align the input image based on the vertical baseline and the horizontal baseline. Since the descriptions provided with reference to FIG. 3 are also applicable here, repeated descriptions with respect to the extractor 1010, the baseline determiner 1020, and the aligner 1030 are not repeated for increased clarity and conciseness.

The movement responsivity determiner 1040 may determine a movement responsivity of the eye of the user based on the input image aligned based on the vertical baseline and the horizontal baseline. For example, the movement responsivity determiner 1040 may determine, or have previously determined, the movement responsivity of the eye of the user based on at least two aligned input images.

The movement responsivity may include a vertical component and a horizontal component. The horizontal component may be extracted from input images, each having a gaze direction vertically identical and differing horizontally in response to an eyeball moving horizontally in general. Conversely, the vertical component may be extracted from input images, each having a gaze direction horizontally identical and differing vertically in response to the eyeball and an eyelid moving vertically.

In an example, and through reference to FIG. 4, the horizontal component of the movement responsivity may be determined by comparing input images having different gaze directions extracted when the user gazes at the first aiming point 410 and the second aiming point 420, and comparing input images having different gaze directions extracted when the user gazes at the third aiming point 430 and the fourth aiming point 440 as described with reference to FIG. 2.

The movement responsivity determiner 1040 may determine the movement responsivity based on a mean value derivative. The movement responsivity determiner 1040 may determine the vertical component of the movement responsivity based on a difference between the input images including the eye of the user having the gaze direction vertically identical and differing horizontally.

In an example, in a calibration or eye tracking phase, the movement responsivity determiner 1040 may divide each of the input images generated in response to the user gazing at the first aiming point 410 through the fourth aiming point 440 of FIG. 4, into image blocks of predetermined sizes.

The movement responsivity determiner 1040 may calculate an average pixel value difference $\Delta I_{1,2}^{Hi} = \|\mu_1^i - \mu_2^i\|$ between image blocks included in the first aiming point 410 and the second aiming point 420, respectively and corresponding to each other. The movement responsivity determiner 1040 may calculate an average pixel value difference $\Delta I_{3,4}^{Hi} = \|\mu_3^i - \mu_4^i\|$ between image blocks included in the third aiming point 430 and the fourth aiming point 440, respectively and corresponding to each other. Here, $\Delta I_{1,2}^{Hi}$ denotes an average pixel value difference between i-th image blocks of the first aiming point 410 and the second aiming point 420 corresponding to each other. $\Delta I_{3,4}^{Hi}$ denotes an average pixel value difference between i-th image blocks of the third aiming point 430 and the fourth aiming point 440 corresponding to each other. $\mu_1^i$ denotes an average pixel value of the i-th image block in the input image of the first aiming point 410. $\mu_2^i$ denotes an average pixel value of the i-th image block in the input image of the second aiming point 420. $\mu_3^i$ denotes an average pixel value of the i-th image block in the input image of the third aiming point 430. $\mu_4^i$ denotes an average pixel value of the i-th image block in the input image of the fourth aiming point 440. Here, the average pixel value may indicate, for example, an average gray scale value of a corresponding pixel. $\|.\|$ denotes a norm.

The movement responsivity determiner 1040 may determine an average pixel value difference $\Delta I^{Hi}$ obtained in a horizontal direction of the i-th image block according to the below Equation 8, for example.

$$\Delta I^{Hi} = \Delta I_{1,2}^{Hi} + \Delta I_{3,4}^{Hi} \quad (8)$$

The movement responsivity determiner 1040 may determine the horizontal component of the movement responsivity based on the average pixel value difference $\Delta I^{Hi}$ obtained in a horizontal direction of the i-th image block according to the below Equation 9, for example.

$$I_{response}^{Hi} = \begin{cases} 1 & \Delta I^{Hi} > \varepsilon \\ 0 & \Delta I^{Hi} \leq \varepsilon \end{cases} \quad (9)$$

In Equation 9, $I_{response}^{Hi}$ denotes the horizontal component of the movement responsivity in the i-th image block, and ε denotes a predetermined threshold, for example, set by the user.

Similarly, the vertical component of the movement responsivity may be determined by comparing input images having different gaze directions extracted when the user gazes at the first aiming point 410 and the third aiming point 430, and comparing input images having different gaze directions extracted when the user gazes at the second aiming point 420 and the fourth aiming point 440 as described with reference to FIG. 2.

Also, the movement responsivity determiner 1040 may determine the vertical component based on a difference between input images including the eye of the user having a gaze direction horizontally identical and differing vertically.

The movement responsivity determiner 1040 may calculate an average pixel value difference $\Delta I_{1,3}^{Vi}=\|\mu_1^i-\mu_3^i\|$ between image blocks included in the first aiming point 410 and the third aiming point 430 of FIG. 4, respectively and corresponding to each other. The movement responsivity determiner 1040 may calculate an average pixel value difference $\Delta I_{2,4}^{Vi}=\|\mu_2^i-\mu_4^i\|$ included in the second aiming point 420 and the fourth aiming point 440 of FIG. 4, respectively and corresponding to each other. Here, $\Delta I_{1,3}^{Vi}$ denotes an average pixel value difference between i-th image blocks of the first aiming point 410 and the third aiming point 430 corresponding to each other. $\Delta I_{2,4}^{Vi}$ denotes an average pixel value difference between i-th image blocks of the second aiming point 420 and the fourth aiming point 440 corresponding to each other.

The movement responsivity determiner 1040 may determine an average pixel value difference $\Delta I^{Vi}$ obtained in a vertical direction of the i-th image block according to the below Equation 10, for example.

$$\Delta I^{Vi}=\Delta I_{1,3}^{Vi}+\Delta I_{2,4}^{Vi} \tag{10}$$

The movement responsivity determiner 1040 may determine the vertical component of the movement responsivity based on the average pixel value difference $\Delta I^{Vi}$ obtained in a vertical direction of the i-th image block according to the below Equation 11, for example.

$$I_{response}^{Vi} = \begin{cases} 1 & \Delta I^{Vi} > \varepsilon \\ 0 & \Delta I^{Vi} \leq \varepsilon \end{cases} \tag{11}$$

In Equation 11, $I_{response}^{Vi}$ denotes the vertical component of the movement responsivity in the i-th image block, and ε denotes a predetermined threshold, for example, set by the user.

In another example, the movement responsivity determiner 1040 may determine the movement responsivity based on a principal component analysis (PCA). In the PCA, a vector that the most appropriately represents characteristics of data may be extracted with respect to the aligned eye images and the data may be projected to the extracted vector, thereby effectively analyzing the data. For example, as discussed above with respect to FIG. 2 where information of an aligned input image may be represented as mathematical dimensional space, e.g., such as a 30 pixel by 60 pixel two-dimensional space, PCA analysis may be applied to such a two-dimensional mathematical space to reduce the dimensions so a one-dimensional vector can be derived to represent information of an eye image. Here, a two-dimensional mathematical space is used only as an example, so information of or for the eye image may be represented through more than two dimensions. Likewise, horizontal information or vertical information of an eye image may be respectively considered through PCA analysis, e.g., by reducing a corresponding one dimensional vector. PCA may be applied to information of multiple aligned eye images.

For example, the movement responsivity determiner 1040 may determine the horizontal component of the movement responsivity by applying the PCA to the input images including the eye of the user having the gaze direction vertically identical and differing horizontally.

In an example, the movement responsivity determiner 1040 may set an image data set $I_1$ of the input image of the first aiming point 410 and an image data set $I_2$ of the input image of the second aiming point 420, as a single set, for example, $I_{1-2}=\{I_1,I_2\}$. Also, the movement responsivity determiner 1040 may vectorize image data included in $I_{1-2}$. For example, the movement responsivity determiner 1040 may stretch image data of a two-dimensional (2D) input image of which a size is M×N, to be in a form of a one-dimensional (1D) vector with a size of M×N, and then may detect a feature vector $E_{1-2}$ having a greatest amount of change in a vector value from $I_{1-2}$ based on the PCA. Similarly, the movement responsivity determiner 1040 may set an image data set $I_3$ of the input image of the third aiming point 430 of FIG. 4 and an image data set $I_4$ of the input image of the fourth aiming point 440 of FIG. 4, as a single set, for example, $I_{3-4}=\{I_3,I_4\}$, and then may detect a feature vector $E_{3-4}$ having the greatest amount of change in a vector value from $I_{3-4}$.

Also, the movement responsivity determiner 1040 may determine a feature $E_H$ having the greatest amount of change in the horizontal direction based on the feature vectors $E_{1-2}$ and $E_{3-4}$ according to the below Equation 12, for example.

$$E_H=\|E_{1-2}\|+\|E_{3-4}\| \tag{12}$$

The movement responsivity determiner 1040 may change a 1D vector $E_H$ with a size of M×N to a 2D feature image $I_E^H$ with a size of M×N obtained through normalization. Based on the 2D feature image $I_E^H$, the horizontal component of the movement responsivity may be determined for each pixel according to the below Equation 13, for example.

$$I_{response}^{Hi} = \begin{cases} 1 & \Delta I_E^{Hi} > \varepsilon \\ 0 & \Delta I_E^{Hi} \leq \varepsilon \end{cases} \tag{13}$$

In Equation 13, $I_{response}^{Hi}$ denotes the horizontal component of the movement responsivity of the i-th pixel, $I_E^{Hi}$ denotes a calculation result corresponding to the i-th pixel of the 2D feature image $I_E^H$, and ε denotes a predetermined threshold, for example, set by the user.

Also, the movement responsivity determiner 1040 may determine the vertical component of the movement responsivity by applying the PCA to the input images including the eye of the user having the gaze direction horizontally identical and differing vertically.

In an example, the movement responsivity determiner 1040 may set the image data set $I_1$ of the input image of the first aiming point 410 of FIG. 4 and the image data set $I_3$ of the input image of the third aiming point 430 of FIG. 4, as a single set, for example, $I_{1-3}=\{I_1,I_3\}$, and then detect a feature vector $E_{1-3}$ having the greatest amount of change in a vector value from $I_{1-3}$. Similarly, the movement responsivity determiner 1040 may set the image data set $I_2$ of the input image of the second aiming point 420 of FIG. 4 and the image data set $I_4$ of the input image of the fourth aiming point 440 of FIG. 4, as a single set, for example, $I_{2-4}=\{I_2,I_4\}$, and then may detect a feature value $E_{2-4}$ having the greatest amount of change in a vector value from $I_{2-4}$.

Also, the movement responsivity determiner 1040 may determine a feature $E_V$ having the greatest amount of change in the vertical direction based on the feature vectors $E_{1-3}$ and $E_{2-4}$ according to the below Equation 14, for example.

$$E_V=\|E_{1-3}\|+\|E_{2-4}\| \qquad (14)$$

The movement responsivity determiner 1040 may change a 1D vector $E_V$ with a size of M×N to a 2D feature image $I_E^V$ with a size of M×N obtained through normalization. Based on the 2D feature image $I_E^V$, the vertical component of the movement responsivity may be determined for each pixel according to the below Equation 15, for example.

$$I_{response}^{Vi} = \begin{cases} 1 & \Delta I_E^{Vi} > \varepsilon \\ 0 & \Delta I_E^{Vi} \leq \varepsilon \end{cases} \qquad (15)$$

In Equation 15, $I_{response}^{Vi}$ denotes the vertical component of the movement responsivity at a position corresponding to the i-th pixel, $I_E^{Vi}$ denotes a calculation corresponding to the i-th pixel in the 2D feature image $I_E^V$, and $\varepsilon$ denotes a predetermined threshold, for example, set by the user.

The movement information determiner 1050 may determine movement information of an eye of the user, e.g., during a gaze tracking/prediction operation, based on such above determined or derived movement responsivity. The movement information may be information associated with the eye of the user and may include, for example, a gaze direction, a gaze position, and an amount of change in a gaze of the user.

The movement information determiner 1050 may determine the movement information of the eye of the user by applying a method of extracting a sub-window average value or a portion of features of the eye to at least one of the horizontal component and the vertical component of the movement responsivity. The movement information determiner 1050 may determine the movement information of the eye of the user by extracting a feature, for example, the movement responsivity of the eye of the user, a corner, a grayscale value, and a boundary of the eye of the user from the input image.

The movement information determiner 1050 may predict a gaze of the user based on the movement information of the eye of the user. The movement information determiner 1050 may predict, for example, a position at which the user is gazing, and a speed and a direction of a change in the gaze of the user.

The movement information determiner 1050 may operate using the movement responsivity including the horizontal component and the vertical component perpendicular to each other. Accordingly, the movement information determiner 1050 may perform a gaze prediction robust to a movement of the eye of the user.

Figure 11:
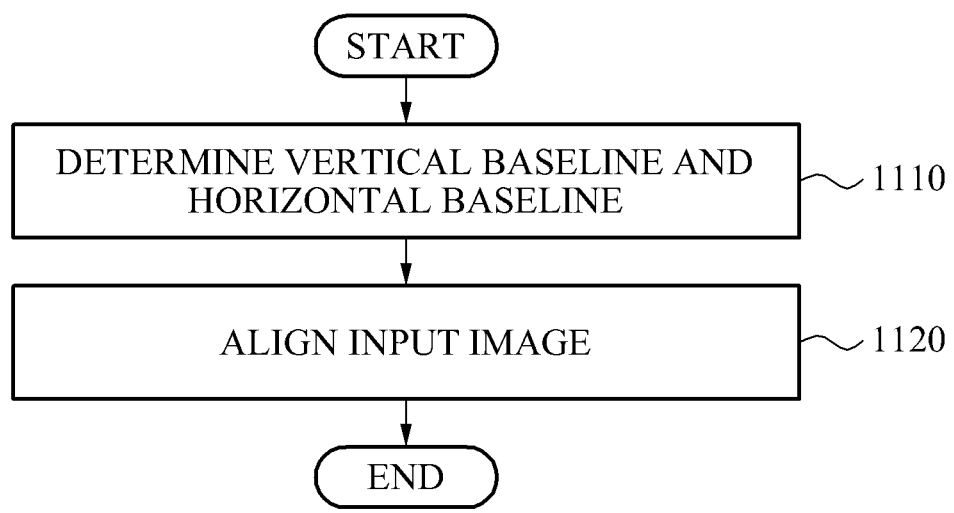
FIG. 11 illustrates an example of an image processing method according to an embodiment.

FIG. 11 illustrates an example of an image processing method according to an embodiment.

The image processing method may be performed by a processor included in an image processing apparatus.

In operation 1110, the image processing apparatus may determine a vertical baseline and a horizontal baseline corresponding to a boundary of an eye of a user, e.g., through one or more projection procedures, for the input image including the eye of the user.

For example, the image processing apparatus may determine the vertical baseline based on a first projection result obtained by projecting the input image to a first axis and a second projection result obtained by projecting the input image to a second axis. In this example, the image processing apparatus may normalize the second projection result based on the first projection result and determine the vertical baseline based on a normalization value of the second projection result. Further, the first axis may correspond to an x axis of the input image, and the second axis may correspond to a y axis of the input image.

The image processing apparatus may determine first straight lines corresponding to an upper boundary and a lower boundary of the eye of the user based on the first projection result obtained by projecting the input image to the first axis and the second projection result obtained by projecting the input image to the second axis. Additionally, the image processing apparatus may determine a second straight line corresponding to the lower boundary of the eye of the user based on a third projection result obtained by projecting a partial image, e.g., cropped or defined as less than the original image and between the first straight lines, to the first axis and a fourth projection result obtained by projecting the partial image to the second axis. Also, the image processing apparatus may determine the second straight line as the vertical baseline.

The image processing apparatus may determine a skin model using an inner canthus area included in the input image, classify the inner canthus area into a skin area and an eye area based on the skin model, and determine the horizontal baseline based on the eye area.

In operation 1120, the image processing apparatus may align the input image based on the vertical baseline and the horizontal baseline.

Since the descriptions provided with reference to FIGS. 1 through 10 are also applicable here, duplicate descriptions with respect to operations of FIG. 11 are not repeated for increased clarity and conciseness.

Figure 12:
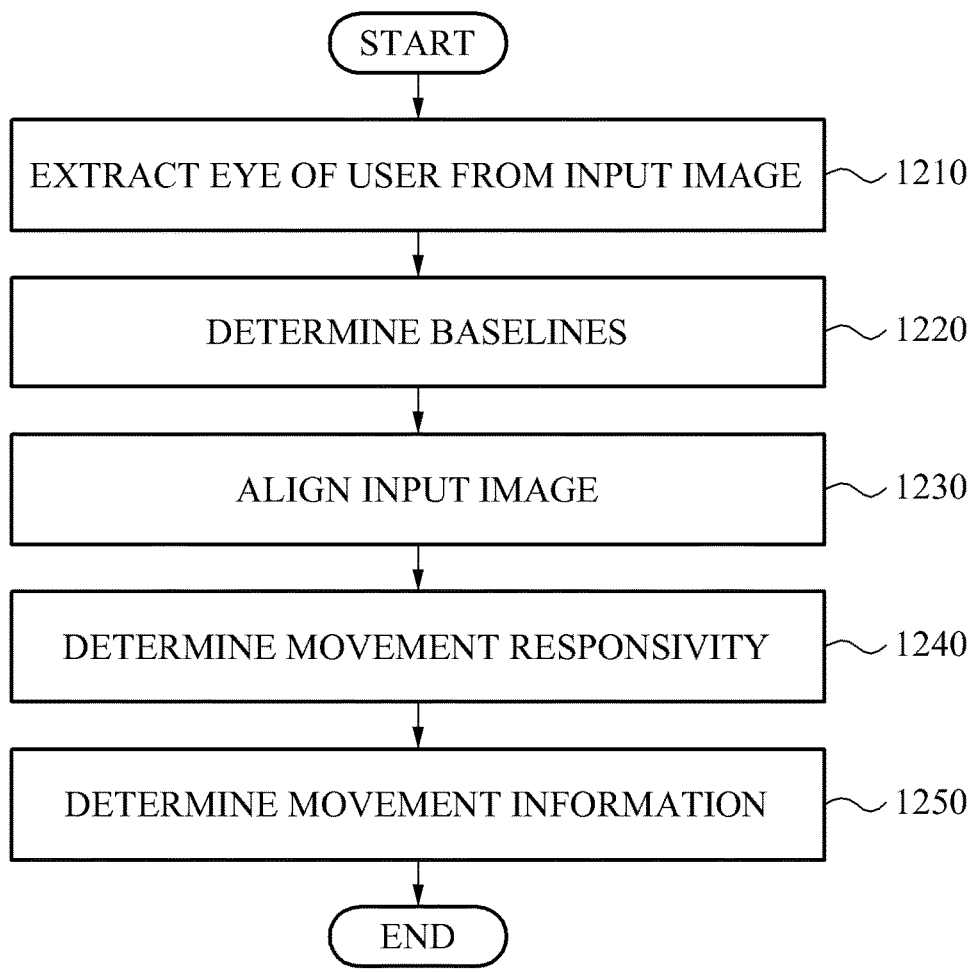
FIG. 12 illustrates an example of an image processing method according to an embodiment.

FIG. 12 illustrates an example of an image processing method according to an embodiment.

In FIG. 12, the image processing method may be performed by a processor included in an image processing apparatus.

In operation 1210, the image processing apparatus may extract an image of an eye of a user in a different gaze state from an input image.

In operation 1220, the image processing apparatus may determine a vertical baseline and a horizontal baseline corresponding to a boundary of the eye of the user.

In operation 1230, the image processing apparatus may align the input image based on the vertical baseline and the horizontal baseline.

In operation 1240, the image processing apparatus may determine a movement responsivity of the eye of the user based on the input image aligned relative to the vertical baseline and the horizontal baseline.

In operation 1250, the image processing apparatus may determine movement information of the eye of the user based on the movement responsivity. The image processing apparatus may predict a gaze of the user using the movement information of the eye of the user. For example, based on the movement information of the eye, the image processing apparatus may determine in which direction the user is currently gazing. The movement information may also be used to discern the speed at which, or how quickly, the gaze of the user changes.

Since the descriptions provided with reference to FIGS. 1 through 11 are also applicable here, duplicate descriptions with respect to operations of FIG. 12 are not repeated for increased clarity and conciseness.

FIGS. 13 through 16 illustrate examples of aligning input images according to an embodiment.

Figure 13:
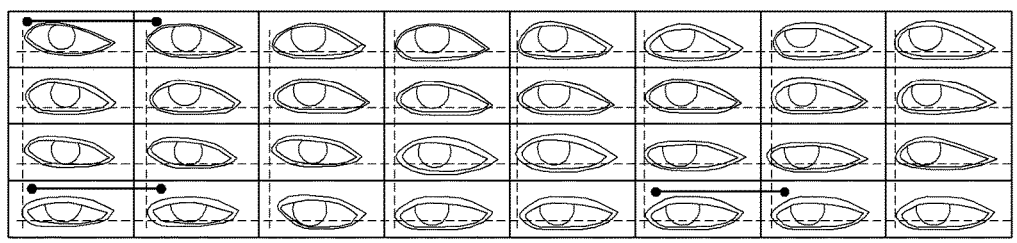
FIGS. 13 through 16 illustrate examples of input images aligned according to an embodiment.
Figure 14:
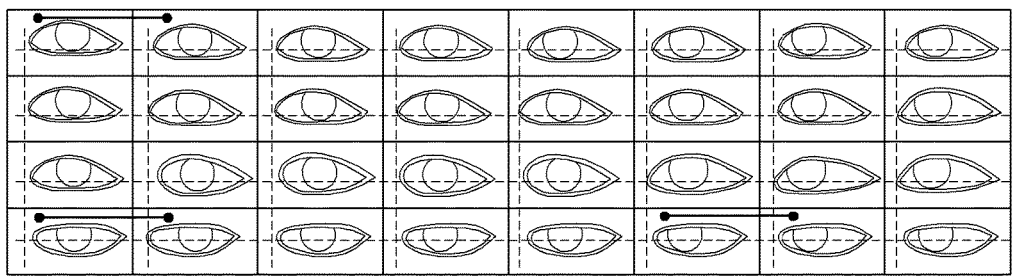
Figure 15:
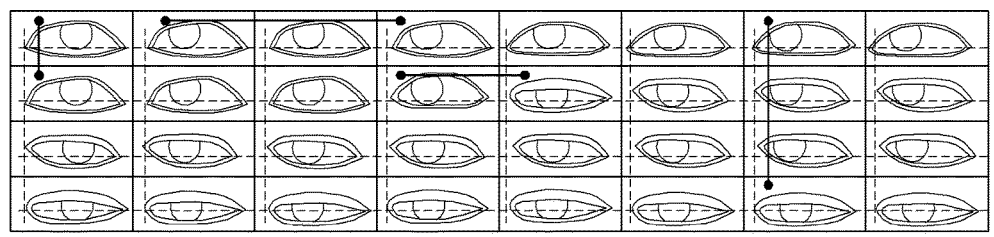
Figure 16:
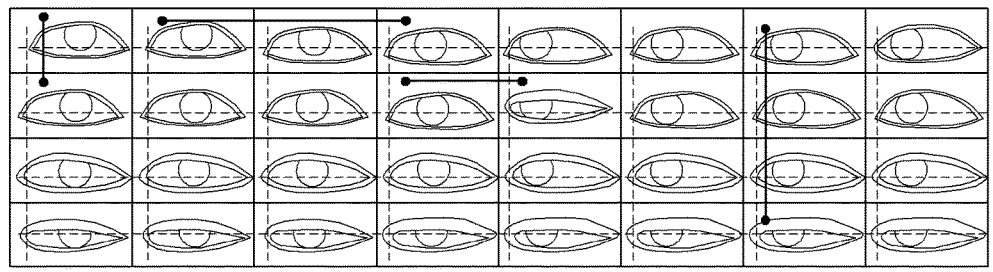

FIGS. 13 and 15 illustrate examples of input images aligned based on an image processing method according to an embodiment. FIGS. 14 and 16 illustrate examples of input images aligned based on a typical algorithm, for example, an active appearance model (AAM) algorithm, according to an embodiment, which may only vertically center/align eyes according the corners of the eyes. In addition, though the above discussed aligning embodiments may be available for geometric-based approaches for gaze detection, any of the above discussed embodiments may also correspond to an appearance-based approach for gaze detection, such as discussed below, noting that alternative appearance-based approaches for gaze detection are equally available. Accordingly, FIGS. 13-16 are representative of an example where there are 32 aiming or calibration points represented by the illustrated 4×8 aligned gaze images. Alternatively, FIGS. 13-16 may be representative of an alternate example where there are less than 32 aiming or calibration points, such as only four aiming or calibration points discussed above with respect to FIG. 4, and the remaining 28 eye images are synthesized, e.g., through interpolation and/or extrapolation, for the remaining virtual aiming or virtual calibration points. As may be represented by FIGS. 13 and 15, the actual captured eye image for a corresponding aiming or calibration point may be aligned according to the determined vertical and horizontal baselines as discussed above, or such synthesizing of eye images, and any synthesizing of any additional calibration eye images between the actual calibration eye images may be performed using the determined vertical and horizontal baselines as discussed above. FIGS. 13 and 15 demonstrate examples of respective determined vertical and horizontal baselines between the different eye images, while FIGS. 14 and 16 demonstrate examples of non-alignment of different eye images.

For example, vertical baselines and horizontal baselines of FIGS. 13 and 15 may be determined to be positioned closer to a boundary of an eye of a user in the input images compared to the respective resulting vertical alignments and horizontal alignments of FIGS. 14 and 16. For example, according to the example embodiment, the vertical baselines of FIGS. 13 and 15 may be positioned closer to a lower eyelid of the user compared to any corresponding vertical alignments of FIGS. 14 and 16. According to the example embodiment, horizontal baselines of FIGS. 13 and 15 may be positioned closer to an inner canthus point of the eye of the user compared to the horizontal alignments of FIGS. 14 and 16. In one or more embodiments, the movement information determination discussed above, such as with regard to FIG. 10, may be implemented using the aligned eye images of FIG. 13 or 15, for example.

According to one or more embodiments, in an example determination, a second projection result in a vertical direction may be normalized based on a first projection result in a horizontal direction as a prior probability to assign a relatively high weight to an eye area including an iris, a pupil, and a white of an eye, thereby more accurately determining a vertical baseline.

According to one or more embodiments, an inner canthus point may be determined using a skin model based on an adjacent skin pixel of an inner canthus area, thereby extracting a horizontal baseline at a high accuracy.

According to one or more embodiments, input images may be aligned based on a vertical baseline and a horizontal baseline extracted at a high accuracy, thereby effectively performing an analysis on an eye of a user included in the input images.

According to one or more embodiments, it may be possible to accurately extract a vertical baseline and a horizontal baseline corresponding to a boundary of an eye of a user in an input image, thereby effectively enhancing accuracy in an alignment of the input image.

The receiver 110, the processor 120, the extractors 310 and 1010, the baseline determiners 320 and 1020, the aligners 330 and 1030, the vertical baseline determiner 321, the horizontal baseline determiner 322, the movement responsivity determiner 1040, and the movement information determiner 1050 in FIGS. 1, 3A, 3B, and 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-9 and 11-16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an image processing apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for an image processing, the method comprising:
   determining a vertical baseline by performing a first projection, of a plurality of projections, using an input image of an eye of a user, and determining a horizontal baseline, the vertical baseline and the horizontal baseline corresponding to a boundary of the eye of the user in the input image;
   determining a refined vertical baseline refined by preforming one or more second projections, of the plurality of projections, based on a result of the performing of the first projection;
   by aligning the input image of the eye based on the refined vertical baseline and the horizontal baseline, generating the aligned input image associated with the input image of the eye; and
   predicting a gaze of the user using the aligned input image of the eye.

2. The method of claim 1, wherein the determining of the vertical baseline comprises determining the vertical baseline based on respective results of the first projection obtained by projecting the input image to a first axis and to a second axis, respectively.

3. The method of claim 2, wherein the determining of the vertical baseline further comprises normalizing the result of the first projection with respect to the second axis based on the result of the first projection with respect to the first axis, and determining the vertical baseline based on a normalization value of the result of the first projection with respect to the second axis.

4. The method of claim 2, wherein the first axis corresponds to an x axis of the input image and the second axis corresponds to a y axis of the input image.

5. A processor-implemented method for an image processing, the method comprising:
  determining a vertical baseline and a horizontal baseline corresponding to a boundary of an eye of a user in an input image of the eye of the user;
  by aligning the input image of the eye based on the vertical baseline and the horizontal baseline, generating the aligned input image associated with the input image of the eye; and
  predicting a gaze of the user using the aligned input image of the eye, wherein the determining comprises:
    determining first straight lines corresponding to an upper boundary and a lower boundary of the eye of the user based on a first projection result obtained by projecting the input image to a first axis and a second projection result obtained by projecting the input image to a second axis;
    determining a second straight line corresponding to the lower boundary of the eye of the user based on a third projection result obtained by projecting a partial image located between the first straight lines to the first axis and a fourth projection result obtained by projecting the partial image to the second axis, and
    determining the second straight line to be the vertical baseline, the vertical baseline corresponding to the lower boundary of the eye of the user.

6. The method of claim 1, wherein the refined vertical baseline is a straight line in contact with a lower eyelid of the eye of the user and disposed parallel with an x axis.

7. The method of claim 1, wherein the determining of the horizontal baseline comprises:
  determining a skin information using an inner canthus area included in the input image;
  classifying the inner canthus area into a skin area and an eye area based on the skin information; and
  determining the horizontal baseline based on the eye area, wherein the inner canthus area comprises an inner canthus point of the eye of the user.

8. The method of claim 7, wherein the determining of the skin information comprises determining the skin information based on a determined skin pixel of the inner canthus area.

9. The method of claim 7, wherein the skin information is updated using a determined inner canthus area resetting the inner canthus area based on the classified skin area and the classified eye area.

10. The method of claim 7, wherein the determining of the horizontal baseline comprises determining an innermost pixel, relative to a centerline of the user, of the eye area to be the inner canthus point, and determining a straight line passing through the inner canthus point and disposed parallel with a y axis to be the horizontal baseline.

11. The method of claim 1, further comprising determining a movement responsivity based on the input image aligned relative to the refined vertical baseline and the horizontal baseline.

12. The method of claim 11, wherein the aligning of the input image includes aligning plural input eye images extracted from plural received input images, the plural received input images including the input image, and
  wherein a horizontal component of the movement responsivity is determined based on a difference between the aligned input eye images having a gaze direction vertically substantially identical and horizontally different.

13. The method of claim 11, wherein the aligning of the input image includes aligning plural input eye images, and
  wherein a vertical component of the movement responsivity is determined based on a difference in pixel values of the aligned input eye images having a gaze direction horizontally substantially identical and vertically different.

14. The method of claim 11, wherein the aligning of the input image includes aligning plural input eye images, and
  wherein a horizontal component is determined by applying a principal component analysis to the aligned input eye images, each having a gaze direction vertically substantially identical and horizontally different.

15. The method of claim 11, wherein the aligning of the input image includes aligning plural input eye images, and
  wherein a vertical component of the movement responsivity is determined by applying a principal component analysis to the aligned input eye images, each having a gaze direction horizontally substantially identical and vertically different.

16. A processor-implemented method for an image processing, the method comprising:
  determining a vertical baseline by performing a first projection, of a plurality of projections, using an input image of an eye of a user, and determining a horizontal baseline, the vertical baseline and the horizontal baseline corresponding to a boundary of the eye of the user in the input image;
  determining a refined vertical baseline refined by preforming one or more second projections, of the plurality of projections, based on a result of the performing of the first projection;
  aligning the input image of the eye based on the refined vertical baseline and the horizontal baseline;
  determining a movement responsivity based on the input image aligned relative to the refined vertical baseline and the horizontal baseline;
  determining movement information of the eye of the user based on the movement responsivity; and
  predicting a gaze of the user based on the movement information of the eye of the user.

17. A non-transitory computer-readable storage medium storing instructions that, when executed by a processor, cause the processor to perform the method of claim 1.

18. An image processing apparatus comprising:
  a receiver configured to receive an input image of an eye of a user; and
  a processor configured to:
    determine a vertical baseline by performing a first projection, of a plurality of projections, using the input image, and determine a horizontal baseline, the vertical baseline and the horizontal baseline corresponding to a boundary of the eye of the user in the input image;
determine a refined vertical baseline refined by preforming one or more second projections, of the plurality of projections, based on a result of the performing of the first projection;
by aligning the input image based on the refined vertical baseline and the horizontal baseline, generate the aligned input image associated with the input image of the eye; and
predict a gaze of the user using the aligned input image of the eye.

19. The apparatus of claim 18, wherein the processor is configured to determine the vertical baseline based on respective results of the first projection obtained by projecting the input image to a first axis and to a second axis, respectively.

20. The apparatus of claim 18, wherein the processor is configured to determine a skin information using an inner canthus area included in the input image, classify the inner canthus area into a skin area and an eye area based on the skin information, and determine the horizontal baseline, and
wherein the inner canthus area comprises an inner canthus point of the eye of the user.

21. The method of claim 11, further comprising:
determining movement information of the eye of the user based on the movement responsivity, wherein the determined movement information of the eye of the user includes a position at which the user is gazing, and a speed and a direction of a change in the gaze of the user; and
predicting the gaze of the user based on the movement information of the eye of the user.

22. The method of claim 1,
wherein the determining of the vertical baseline comprises:
determining first straight lines corresponding to an upper boundary and a lower boundary of the eye of the user based on respective results of the first projection obtained by projecting the input image to a first axis and a second axis, respectively, and
wherein the determining of the refined vertical baseline comprises:
determining a second straight line corresponding to the lower boundary of the eye of the user based on respective results of the one or more second projections obtained respectively by projecting a partial image located between the first straight lines to the first axis and by projecting the partial image to the second axis; and
determining the second straight line to be the refined vertical baseline, the refined vertical baseline corresponding to the lower boundary of the eye of the user.

* * * * *